C. W. DAKE.
TURBINE.
APPLICATION FILED MAR. 30, 1921.
1,431,636.
Patented Oct. 10, 1922.
3 SHEETS—SHEET 1.
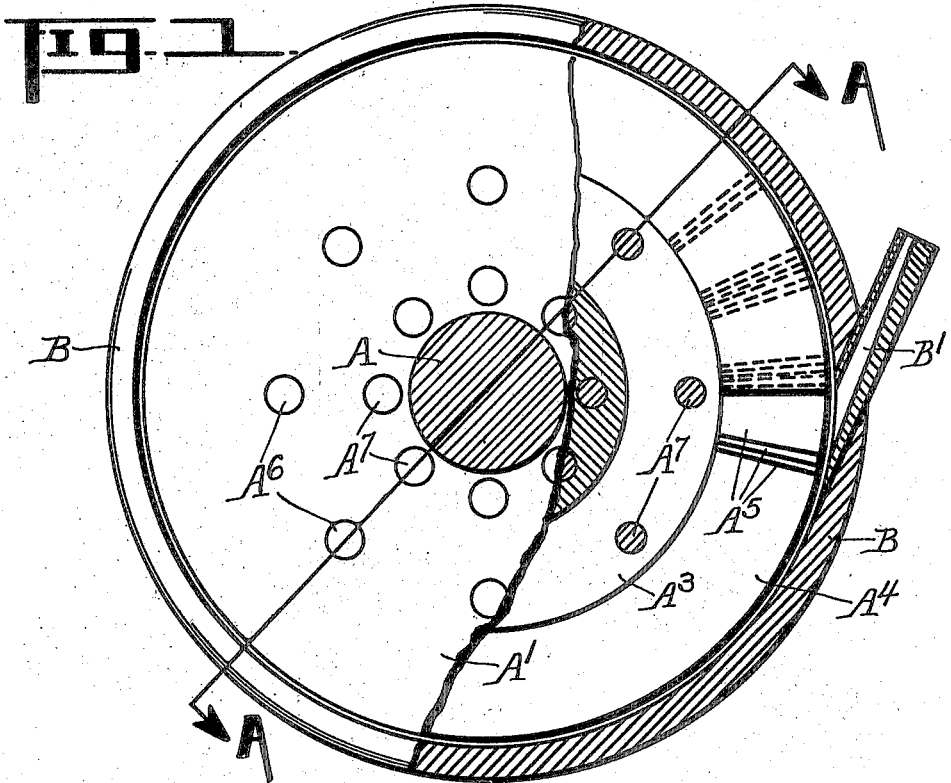
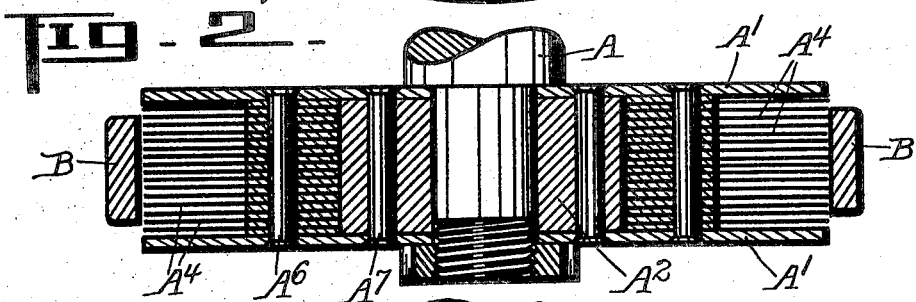
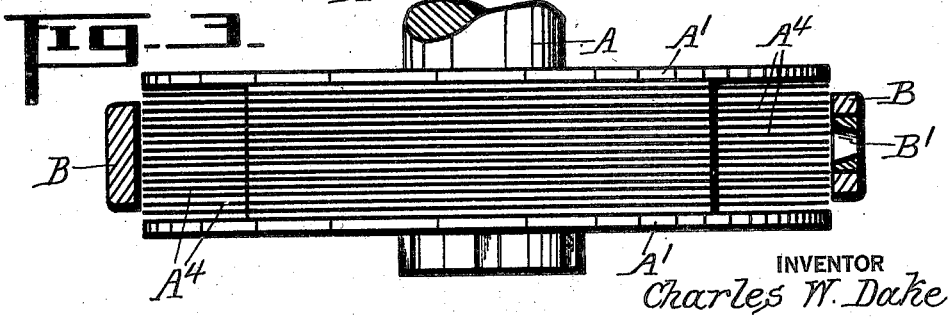
INVENTOR
Charles W. Dake.
BY
Parker & Carter
ATTORNEY

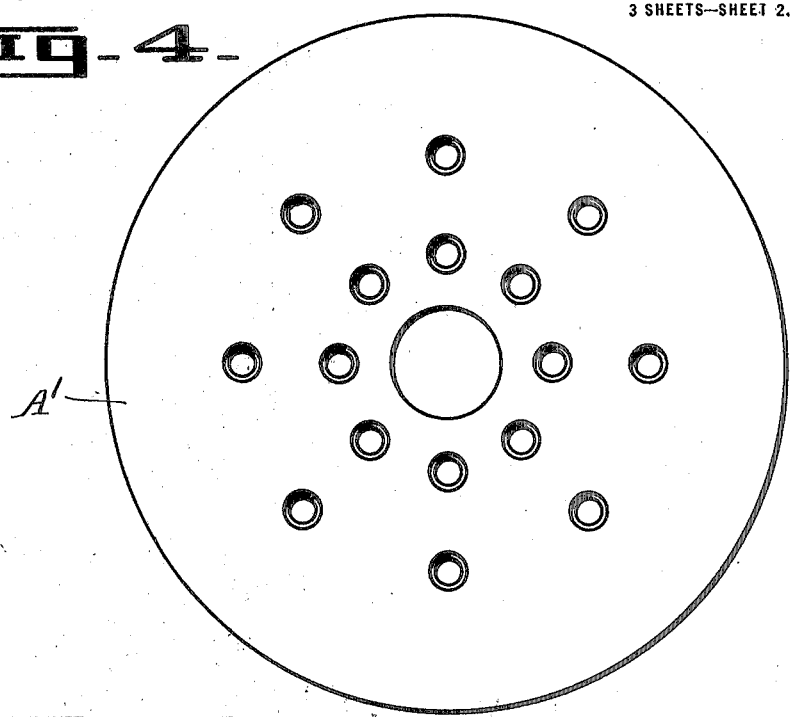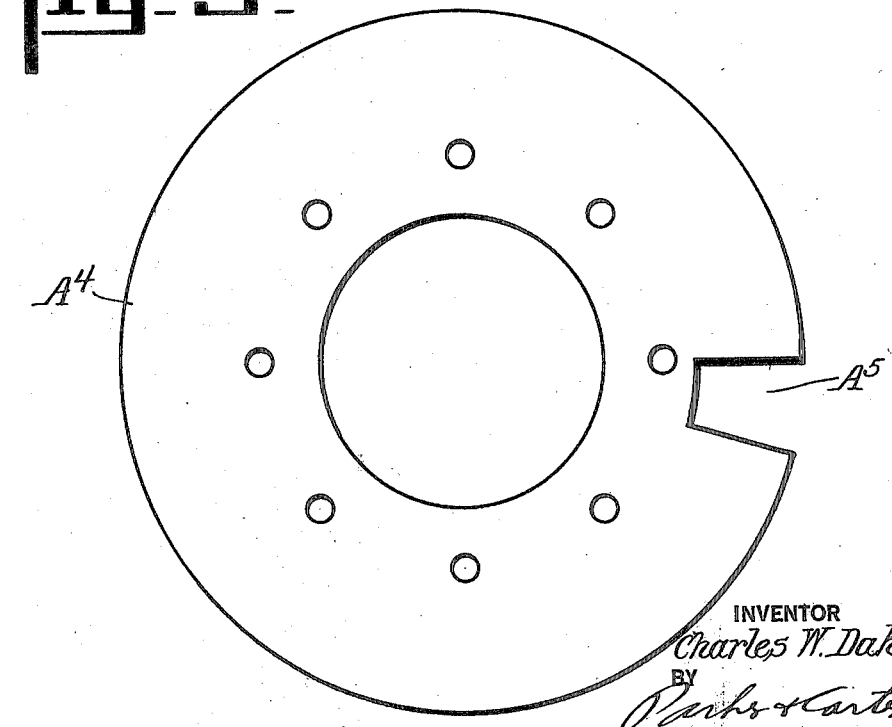

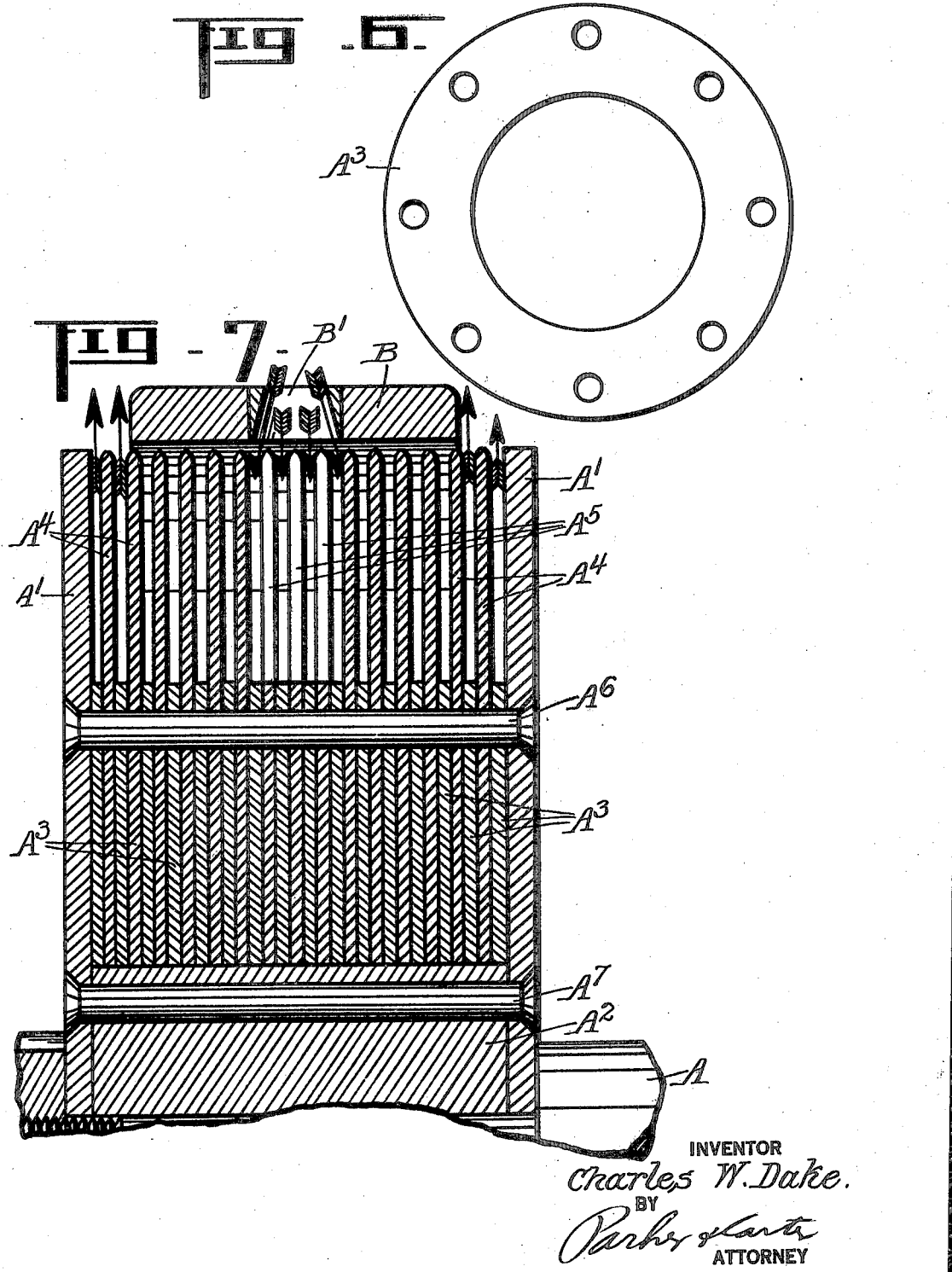

Patented Oct. 10, 1922.

1,431,636

UNITED STATES PATENT OFFICE.

CHARLES W. DAKE, OF CHICAGO, ILLINOIS, ASSIGNOR TO THE PYLE NATIONAL COMPANY, OF CHICAGO, ILLINOIS, A CORPORATION OF NEW JERSEY.

TURBINE.

Application filed March 30, 1921. Serial No. 456,911.

*To all whom it may concern:*

Be it known that I, CHARLES W. DAKE, a citizen of the United States, residing at Chicago, in the county of Cook and State of Illinois, have invented a certain new and useful Improvement in Turbines, of which the following is a specification.

My invention relates to turbines. It has for one object to provide a new and improved form of turbine structure such as may be operated by elastic fluid such as steam or gas and the like, or by hydraulic fluid, water, oil and the like, and the only difference between the hydraulic and elastic fluid turbines embodying my invention would be in matters of detail and dimension, size and shape of the nozzle and rotational speed. I prefer, however, as a general proposition to drive turbines such as mine by means of elastic fluid.

My turbine comprises in general terms, an apparatus whereby the power of the machine is derived by the friction of the fluid against the side walls of the channels in the rotor, that is to say by the adhesion, and viscosity of rapidly moving fluid against these surfaces.

One object of my invention therefore is to provide such a friction turbine wherein an exceedingly long travel may be given the motive fluid so that there will be ample time for that fluid to give up its speed and be reduced to the same linear speed as the friction surface which it engages before it becomes necessary to discharge the motive fluid from the rotor.

There have been in the past a number of devices wherein frictional engagement of the driving surfaces by the motive fluid was relied upon for the purpose of developing the power and my apparatus differs from them in the arrangements whereby a greatly increased length of path may be travelled, and whereby the speed of the motive fluid may be drawn by frictional resistance down to the speed of the driven parts with a minimum leakage, wastage and loss and thus it is possible by my arrangement for the fluid to give to the motor the maximum percentage of its kinetic energy, and it is also possible by my arrangement to operate turbines at exceedingly low speeds.

The turbines of my type may be operated at exceptionally low speeds, and the rotor is so constructed as to absorb all of the velocity from a highly efficient nozzle, or, in other words, one which converts the pressure of the steam into velocity and increases that velocity to the maximum within the expansion of the steam from the highest pressure which it may be possible to generate.

My invention relates to improvements in turbines adapted to be driven by steam or other suitable motive fluid. It has for one object to provide a turbine wherein the motive fluid gives up its kinetic energy by frictional engagement with the walls of an extended passage of such length that by the time the steam or other motive fluid has passed completely therethrough it will have given up all its kinetic energy. Other objects will appear from time to time in the specification.

The invention is illustrated more or less diagrammatically in the accompanying drawings, wherein—

Figure 1 is a part section and part end elevation of the rotor with the shroud and nozzle in section;

Fig. 2 is a section along the line A—A of Fig. 1;

Fig. 3 is a section through the shroud showing the rotor in elevation;

Fig. 4 is a plan of the end plate of the rotor;

Fig. 5 is a plan of one of the propelling disks;

Fig. 6 is a plan of one of the annular spacing disks; and

Fig. 7 is an enlarged section through the rotor.

Like parts are indicated by like characters throughout the drawings.

A is the turbine shaft. It carries the two end plates $A^1$ $A^1$, between which is located a hub $A^2$. Surrounding this hub $A^2$ are alternate annular spacing rings $A^3$ and driving disks $A^4$. These driving disks or plates $A^4$ have each a steam notch $A^5$ located at one point on the periphery thereof. These disks are held in position between the end plates by means of the holding bolts $A^6$, $A^7$, and are so disposed that the notches do not come in line. This is suggested by the dotted lines in Fig. 1.

B is an annular shroud ring surrounding the rotor, the rotor being adapted to rotate within this ring. It will be noted that this ring, measured in axial direction, is shorter than the rotor itself, so that the space between the outermost driving disks is not closed by the shroud but the space between the inner disks is. B¹ is a steam nozzle passing through the shroud and adapted to discharge against the peripheries of the disks along a tangential line at a point intermediate the two ends of the rotor.

The arrows in Fig. 7 show the path of the steam or other motive fluid. It rushes in at high velocity through the expanding nozzle and is discharged along a radial line into the thin annular driving grooves or channels between the disks, quickly filling them and, by its frictional engagement with the walls of the disks, causing the rotor to commence rotation. As soon as the steam has filled the spaces between the disks in line with the nozzle, it commences to overflow toward both ends of the shaft through the notches in the disks until the spaces between all the disks are filled with rapid traveling steam. This steam gradually gives up its kinetic energy as it works its way along toward the discharge openings at either end of the shroud, and as it travels this labyrinthine path it is impossible for any of the steam to get out before it passes through the entire system, unless there is a slight spilling through the space between the driving disks and the shroud. Such spilling is only from one steam chamber to the next, however, and is so slight as to be negligible. and by properly arranging the number of steam chambers—that is, the number of disks and width of the shroud—it is possible to make sure that no appreciable body of steam will escape from the system until it has been in the system long enough, and been in engagement with the disks long enough, to give up all its kinetic energy.

I claim:

1. In a turbine, a rotor comprising a plurality of flat spaced peripherally notched disks, a shroud surrounding the rotor and inclosing the outer edges of said disk, and means for directing motive fluid into the space between the disks and the shroud.

2. In a turbine, a rotor comprising a plurality of parallel flat peripherally notched disks, annular spacing end rings between them, end plates inclosing them and means for holding them all together on the rotor shaft, a shroud surrounding the rotor of lesser length measured in an axial direction than the rotor itself, and means for discharging motive fluid into the space between said disks intermediate the ends of the shroud.

3. In a turbine, a plurality of flat friction chambers arranged in series about the periphery of the rotor and lying in planes transversal to the axis of rotation of the rotor, and means for discharging motive fluid at high velocity into one of said chambers and guiding it through all of said chambers and subsequently discharging it therefrom.

4. In a turbine, a plurality of parallel flat friction elements and lying in planes transversal to the axis of rotation of the rotor, means for discharging motive fluid against them, and means for conducting said fluid successively past a plurality of said elements while it gives up its kinetic energy by frictional engagement with them.

5. In a turbine, a plurality of flat annular fluid chambers, means for discharging motive fluid into one of them, and connections between said chambers whereby the fluid passes successively from one to another as it gives up its kinetic energy by frictional engagement with the walls of said chambers.

6. In a turbine, a plurality of flat annular fluid chambers, means for discharging motive fluid into one of them, and connections between said chambers whereby the fluid passes successively from one to another as it gives up its kinetic energy by frictional engagement with the walls of said chambers, said chambers being formed by a plurality of flat driving disks notched to provide passages between the chambers and a shroud surrounding them.

7. A turbine comprising a plurality of parallel annular fluid chambers, a single connection between each pair of adjacent chambers, said connections being out of line with the connection between the other chambers, and means for discharging motive fluid through the entire system of chambers.

8. In a steam turbine, a plurality of spaced parallel apertured discs, a shroud surrounding some of them, and means for discharging motive fluid into the spaces between some of the said discs whereby it passes out from space to space giving up its kinetic energy as it goes.

9. In a turbine, a plurality of flat annular motive fluid chambers, connections between them, and means for conducting motive fluid through said chambers successively.

10. In a turbine, a plurality of flat friction chambers arranged in series about the periphery of the rotor, and means for discharging motive fluid at high velocity into a centrally disposed chamber and guiding it through all of said chambers and subsequently discharging it therefrom.

11. A turbine, a plurality of flat friction chambers arranged in series about the periphery of the rotor and lying in planes transversal to the axis of rotation of the rotor and means for discharging motive fluid at high velocity into a single group of said chambers and guiding it through all of said chambers and subsequently discharging it therefrom.

12. In a steam turbine, a plurality of separate spaced friction plates, means for directing motive fluid along said plates and for maintaining the fluid continuously in contact with successive plates until it has given up all of its kinetic energy.

13. In a fluid turbine, means for frictionally absorbing the energy of the motive fluid by successive engagement of the motive fluid with a plurality of separate spaced frictional surfaces arranged in series.

14. In a fluid turbine, means for frictionally absorbing the energy of the motive fluid by successive engagement of the motive fluid with a plurality of separate spaced frictional surfaces arranged in series, and means for preventing the escape of the motive fluid until it has passed all of said surfaces.

15. In a fluid turbine, a rotor comprising a plurality of parallel flat frictional elements and means for guiding a motive fluid axially about said rotor from end to end thereof and maintaining it in frictional contact with said elements.

Signed at Chicago, county of Cook and State of Illinois, this 21st day of March, 1921.

CHARLES W. DAKE.